United States Patent [19]

McSweeney et al.

[11] Patent Number: 5,032,559
[45] Date of Patent: Jul. 16, 1991

[54] METHOD OF PREPARING BARIUM, TITANIUM, ZIRCONIUM OXIDE FERROELECTRIC CERAMIC COMPOSITIONS

[75] Inventors: Robert T. McSweeney, Wakefield; Karlene Zuk, Peabody, both of Mass.

[73] Assignee: GTE Products Corporation, Danvers, Mass.

[21] Appl. No.: 526,957

[22] Filed: May 21, 1990

Related U.S. Application Data

[63] Continuation of Ser. No. 349,955, May 5, 1989, abandoned, which is a continuation of Ser. No. 115,223, Oct. 30, 1987, abandoned.

[51] Int. Cl.$^5$ .............................................. C04B 35/49
[52] U.S. Cl. .................................. 501/137; 501/134; 501/136; 423/598; 252/62.9
[58] Field of Search ...................... 501/134, 136, 137; 423/598; 252/62.9

[56] References Cited

U.S. PATENT DOCUMENTS

| | | |
|---|---|---|
| 3,330,697 | 7/1967 | Pechini . |
| 3,699,044 | 10/1972 | Dosch et al. ............. 252/62.9 PZT |
| 3,759,683 | 9/1973 | Dislich et al. . |
| 3,847,583 | 11/1974 | Dislich et al. . |
| 4,086,649 | 4/1978 | Harold, III . |
| 4,360,762 | 11/1982 | Yamamoto et al. . |
| 4,404,029 | 9/1983 | Iwaya et al. . |
| 4,517,496 | 5/1985 | Adachi et al. . |
| 4,537,865 | 8/1985 | Okabe et al. ..................... 501/137 X |
| 4,543,341 | 9/1985 | Barringer et al. .............. 501/134 X |
| 4,606,906 | 8/1986 | Ritter . |
| 4,616,289 | 10/1986 | Itakura et al. . |

FOREIGN PATENT DOCUMENTS

| | | | |
|---|---|---|---|
| 0198491 | 11/1983 | Japan | 423/598 |
| 0199719 | 11/1983 | Japan | 423/598 |
| 0195575 | 11/1984 | Japan | 501/136 |
| 0195576 | 11/1984 | Japan | 501/136 |
| 0246222 | 12/1985 | Japan | 501/136 |

OTHER PUBLICATIONS

J. J. Ritter et al., "Alkoxide Precursor Synthesis and Characterization of Phases in the Barium-Titanium Oxide System", J. Am. Soc. 69(2), 155–162 (1986).

Matsuyama et al., "Pulse-like Voltage Generation Using Polarization Reversal of Ferroelectric Ba-substituted Pb(Zr,Ti)O$_3$ Ceramics", Japan, J. Appl. Phys., vol. 16, No. 10, pp. 1871–1872, 1977.

Hennings et al., "Diffuse Ferroelectric Phase Transitions in Ba(Ti$_{1-y}$Zr$_y$)O$_3$ Ceramics", J. Am. Ceramic Soc., vol. 65, No. 11, pp. 539–544, 1982.

Barringer et al., "Formation, Packing and Sintering of Monodisperse TiO$_2$", Report No. 15, Massachusetts Institute of Technology Ceramics Processing Research Laboratory, Jul. 1982.

Hiromi Adachi, "The Lumi Quick Fluorescent-Lamp Starter", Mitsubishi Electric Advance.

(List continued on next page.)

Primary Examiner—Karl Group
Attorney, Agent, or Firm—Martha Ann Finnegan

[57] ABSTRACT

A procedure used to prepare Ba(Ti$_{1-x}$,Zr$_x$)O$_3$ compositions wherein $0<x<0.25$ having a more completely randomized distribution of Ti and Zr atoms on the TiO$_2$ sublattice of barium titanate is described. In accordance with the present invention there is provided a method for preparing barium titanium zirconium oxide ferroelectic ceramic. The present method comprises mixing tetraalkyl titanate and alkyl zirconate in appropriate amounts to produce (Ti$_{1-x}$Zr$_x$)alkoxide wherein $0<x<0.25$; reacting (Ti$_{1-x}$Zr$_x$) alkoxide wherein $0<x<0.25$ to form (Ti$_{1-x}$Zr$_x$)O$_2$ wherein $0<x<0.25$ admixing (Ti$_{1-x}$Zr$_x$)O$_2$ with BaCO$_3$, said BaCO$_3$ being added in a molar ratio greater than 1 relative to (Ti$_{1-x}$Zr$_x$)O$_2$; heating the admixture for a period of time and at a temperature sufficient to produce Ba(Ti$_{1-x}$Zr$_x$)O$_3$ wherein $0<x<0.25$. The improved randomization of the Ti and Zr atom distributions results in a ferroelectric ceramic material having squarer electrical polarization hysteresis loops and higher remanent polarization values than can be obtained from conventionally prepared materials of similar composition.

19 Claims, 10 Drawing Sheets

OTHER PUBLICATIONS

Stephen Herman, "Ferroelectric Capacitors for Discharge Lamp Ballast Circuits", Ferroelectrics, vol. 27, pp. 281–284, 1980.

Stephen Herman, "Nonlinear Capacitors Improve the Performance of Saturable Lead Ballasts", Journal of IES, vol. 8, pp. 122–125, 4/89.

Bulent E. Yoldas, "Zirconium Oxides Formed by Hydrolytic Condensation of Alkoxides and Parameters that Affect Their Morphology", J. Materials Sci., 21, pp. 1080–1086, (1986).

Van Zyl et al., "Chemical Reactor System for $TiO_2$ and $ZrO_2$ Powder Synthesis", J. Science & Engineering, vol. 78, pp. 217–222 (1986).

Smith II, et al., "Preparation and Characterization of Alkoxy-Derived $SrZrO_3$ and $SrTiO_3$", Presented in part at the 71st Annual Meeting, The American Ceramic Society, May 7, 1969 (Joint Session VI, No. 2-J-VI-69).

B. E. Yoldas, "Preparation of Glasses and Ceramics From Metal-Organic Compounds", J. of Materials Science, vol. 12, pp. 1203–1208 (1977).

K. S. Mazdiyasni, "Metal Alkoxy-Derived Powders", Presented at Sagamore Army Mater. Res. Conf., PWC SAMPD2, 9/18/85.

Yoshiharu Ozaki, "Ultrafine Electroceramic Powder Preparation From Metal Alkoxides", Ferroelectrics, vol. 49, pp. 285–296, (1983).

Salze et al., "Elaboration of Fine Micropowders From Organometallic Polymers Precursors", J. of Non-Crystalline Solids, vol. 82, pp. 314–320, (1986).

8X, 1,250. μM 200X, 50. μM 50X, 200. μM 200X, 50. μM 200X, 50. μM 200X, 50. μM

METHOD OF PREPARING BARIUM, TITANIUM, ZIRCONIUM OXIDE FERROELECTRIC CERAMIC COMPOSITIONS

This is a continuation of copending U.S. application(s) Ser. No. 07/349,955 filed on May 5, 1989 which is a continuation of U.S. Ser. No. 07/115,223, filed Oct. 3, 1987, both now abandoned.

BACKGROUND OF THE INVENTION

Most ferroelectric ceramics of commercial importance are prepared by conventional powder processing techniques. Such techniques involve mixing the precursor oxide (e.g., carbonate, nitrate, chloride, acetate, etc.) powders in the correct proportions to produce the desired composition, followed by thermally reacting the mixture to produce a new compound or mixture of new compounds. The precursor powders are converted through the thermal reaction process into a new material which is characterized by a crystal structure or mixture of crystal structures which are different from those of the precursors. In conventional powder processing the degree of homogenization and conversion to the new compound or compounds depends on particle size, how well the precursors are mixed, and the rate at which interdiffusion of the atomic species occurs under the thermal reaction conditions imposed.

The ultimate limitation to homogenization in conventional powder processing is the fineness of the precursor particle size. Interdiffusion is often not able to eliminate all the compositional differences introduced by using precursor powders of some finite particle size. After the thermal treatment some remnant trace of the precursor particles can remain in the form of microregions richer in a particular component. Enrichment of a particular species in isolated microregions therefore indicates that the donor particle for that species formerly resided in the center of the microregion richer in that particular component. For example, in the reaction,

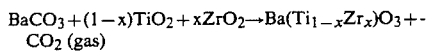

$$BaCO_3 + (1-x)TiO_2 + xZrO_2 \rightarrow Ba(Ti_{1-x}Zr_x)O_3 + CO_2 \text{ (gas)}$$

regions slightly richer in Zr or Ti may exist after thermal reaction reflecting the very slow diffusion of Ti and Zr atoms in the titanium dioxide sublattice of $Ba(Ti,Zr)O_3$. These regions of slightly differing composition would still have the same crystal structure but might be characterized by slightly different lattice parameters and therefore Curie temperatures. The center of each microregion would therefore correspond to the former center of the particle which produced the enrichment of that species, as is shown in FIGS. 1a and 1b. FIG. 1a schematically illustrates a mixture of barium carbonate, zirconium dioxide, and titanium dioxide prior to thermal reaction. FIG. 1b schematically represents $Ba(Ti,Zr)O_3$ having retained zirconium and titanium microregions after thermal reaction.

The inhomogeneous, or nonrandom, distribution of components in a particular compound such as $Ba(Ti,Zr)O_3$ can result in electrical properties which are less than ideal. In the example cited above, the presence of regions slightly richer in Zr or Ti atoms can lead to a material having a broader and lower than desired permittivity peak since each region is characterized by a slightly different Curie temperature dependent on its average Zr concentration.

Each microregion is also characterized by a slightly different coercive electric field value and polarization value. Regions having higher Zr concentrations have lower coercive electric field values and lower polarization values, whereas the opposite is the case for microregions having higher Ti concentration may not be very great, on the order of ±1%, any deviation from a completely random distribution of Ti and Zr atoms in the Ti sublattice results in the macro ferroelectric ceramic part having a hysteresis loop that is less square and a polarization value lower than is optimally possible. The imposition of a distribution of polarization values and coercive voltage values in place of a distinct value, corresponding to a specific composition, degrades the performance of the ferroelectric ceramic with respect to its electrical polarization performance.

Inhomogeneities in composition which result from conventional powder processing can be eliminated by using a complete chemical processing technique which entails mixing the correct proportions of precursor ingredients in the liquid state to produce the desired composition or compound and then converting this liquid mix to a solid, usually a powder. Since mixing is performed in the liquid state, particle size effects are avoided provided the liquid can be converted into a solid without undergoing segregation. If the liquid precursors are properly chosen so as to be compatible, mixing of the components can occur at the molecular level.

The major problems inherent in all total chemical processing techniques are that they are expensive, inefficient and difficult to control. Typically only very small quantities of powder can be conveniently prepared from large quantities of liquid precursors and solvents. Since the solvents or the liquid precursors themselves are usually much more expensive than standard particulate precursors, complete chemical processing techniques are cost prohibitive on a commercial scale. More importantly, in the case of ferroelectric ceramic compounds such as $Ba(Ti_{1-x}Zr_x)O_3$, $0 < x < 0.25$, the large cation to small cation balance, or stoichiometry, is very difficult to control in the conversion of the liquid to the powder form. (Ba is considered to be a large cation and Ti and Zr are considered to be small cations.)

The accidental formation of additional crystal phases, such as $TiO_2$ or $Ba_2TiO_4$, due to deviations from stoichiometry incurred during the liquid to solid conversion, can severely degrade the overall properties of the final material even though good mixing of the Ti and Zr atoms in the Ti sublattice is achieved in the major phase material. The presence of excess $TiO_2$ reduces the peak permittivity, increases the coercive voltage, and reduces the polarization of the composite ferroelectric. The presence of excess BaO or the intermediate phase, $Ba_2TiO_4$, produces the same deterioration in properties and additionally causes the part formed from such a two-phase mixture to be moisture-sensitive.

SUMMARY OF THE INVENTION

In accordance with the present invention there is provided a method for preparing barium titanium zirconium oxide ferroelectric ceramic. The present method comprises preparing $(Ti_{1-x}Zr_x)$-alkoxide wherein $0 < x \leq 0.25$; reacting said $(Ti_{1-x}Zr_x)$-alkoxide to form $TiZrO_4$ and $(Ti_{1-s}Zr_s)O_2$, wherein s is the solubility limit for $ZrO_2$ in $TiO_2$; admixing said $(Ti_{1-s}Zr_s)O_2$ and $TiZrO_4$ with a BaO precursor, said BaO precursor, $(Ti_{1-s}Zr_s)O_2$, and $TiZrO_4$ being present in a $TiZrO_4]$ having a value greater than 1; and heating the admixture for a period of time and at a sufficient temperature to produce $Ba(Ti_{1-x}Zr_x)O_3$ wherein $0 < x0.25$.

Figure 1A:
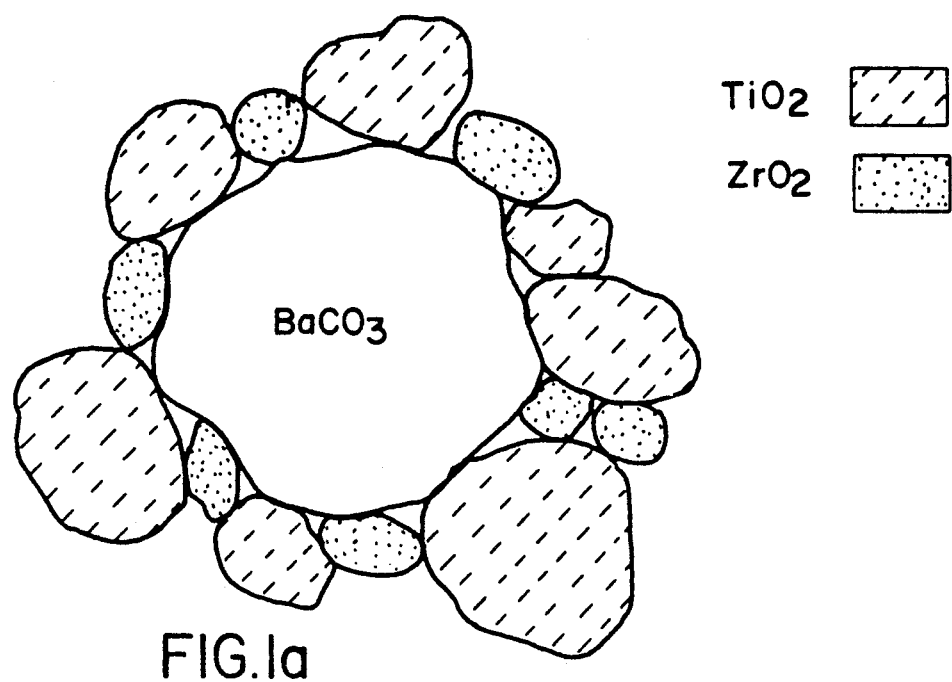
FIG. 1a schematically illustrates a mixture of $BaCO_3$, $ZrO_2$, and $TiO_2$ before thermal reaction.
Figure 1B:
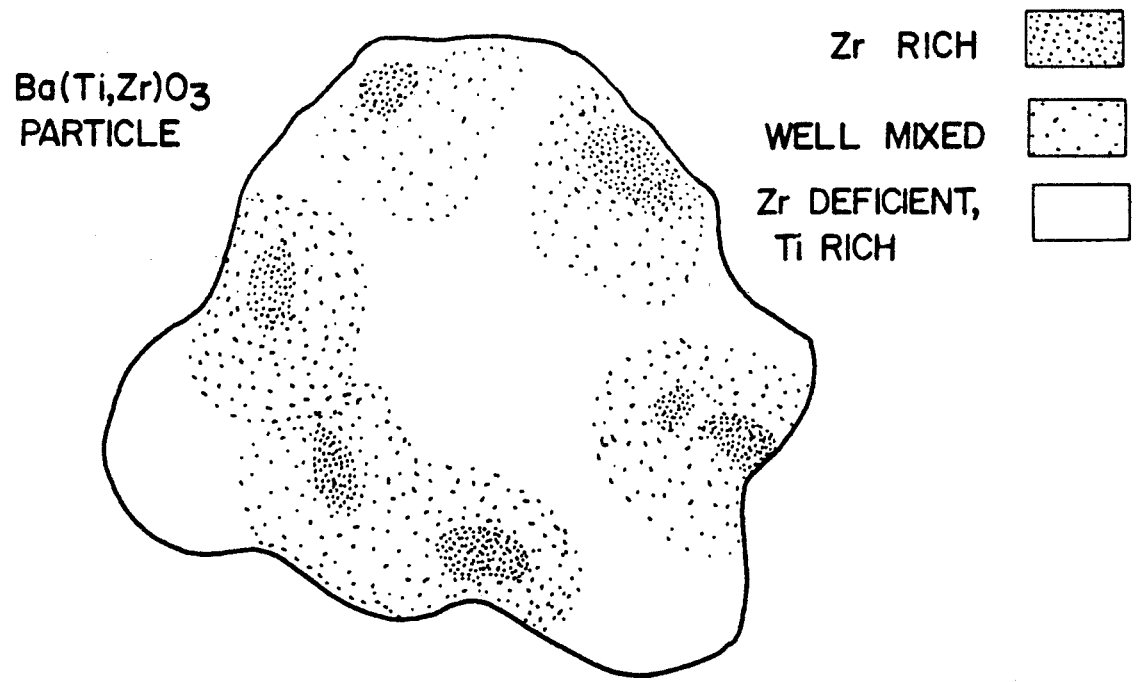
FIG. 1b schematically illustrates barium titanium zirconium oxide with retained zirconium and titanium microregions after thermal reaction.

For a better understanding of the present invention, together with other and further objects, advantages and capabilities thereof, reference is made to the following disclosure and appended claims in connection with the above described drawings.

DETAILED DESCRIPTION

In accordance with the present invention there is provided an improved method for preparing barium titanium zirconium oxide ferroelectric ceramic material. The method of the present invention achieves a substantially uniform and random distribution of titanium and zirconium ions on the $TiO_2$ sublattice of $Ba(Ti_{1-x}Zr_x)O_3$, while minimizing the concentration of undesired minor phases. For purposes of the present application, a substantially uniform and random distribution of Ti and Zr ions on the $TiO_2$ sublattice is identified by square polarization hysteresis loops for the material, provided the grain size is greater than about 50 micrometers. This method also provides adequate control of large-to-small cation stoichiometry. Such stoichiometric control permit achievement of a large-to-small cation ratio $(BaO/(TiO_{1-x}Zr_x))$ having a value of $1.0000 \pm 0.00050$.

The method of the present invention includes preparing $(Ti_{1-x}Zr_x)$-alkoxide wherein $0 < x \leq 0.25$. The $(Ti_{1-x}Zr_x)$-alkoxide is then reacted to form $TiZrO_4$ and $(Ti_{1-s}Zr_s)O_2$ wherein s is the solubility limit for $ZrO_2$ in $TiO_2$. The $TiZrO_4$ and $(Ti_{1-s}Zr_s)O_2$ is admixed with a barium oxide precursor, e.g., $BaCO_3$, $BaNO_3$, $BaCl_2$, $Ba(OOCCH_3)_2$, etc., the barium oxide precursor, $(Ti_{1-s}Zr_s)O_2$, and $TiZrO_4$ being present in the admixture in a molar ratio of [barium oxide precursor]/[$(Ti_{1-s}Zr_s)O_2 + TiZrO_4$)] having a value greater than 1. The $(Ti_{1-s}Zr_s)O_2$, $TiZrO_4$, and $BaCO_3$ admixture is then heated at a sufficient temperature and for a sufficient period of time to produce $Ba(Ti_{1-x}Zr_x)O_3$ where $0 < x \leq 0.25$.

The $(Ti_{1-x}Zr_x)$-alkoxide is preferably prepared from tetraalkyl titanate and tetraalkyl zirconate liquids. The alkyl groups (R) of the titanate and zirconate starting materials are lower alkyl groups, e.g., straight, branched, or cyclic $C_1$-$C_{12}$ alkyl groups, preferably $C_2$-$C_8$ alkyl groups; and most preferably $C_4$-$C_6$. These materials are mixed in the proper proportions either mechanically or by reflux heating.

After mixing, the (Ti,Zr)-alkoxide solution is reacted to form the $(Ti_{1-x}Zr_x)O_2$-precursor (also referred to herein as "TZ"). Preferably, the $(Ti_{1-x}Zr_x)O_2$-precursor is obtained by hydrolyzing the alkoxide, isolating the resultant precipitate, and heating the precipitate for a sufficient time and at a sufficient temperature to form the $(Ti_{1-x}Zr_x)O_2$-precursor. Most preferably, the alkoxide solution is hydrolyzed by bleeding it into a water bath subjected to intense mechanical agitation. During this process it is believed that the alkoxy-groups, i.e., (OR) groups, of the alkoxide precursors are broken off and replaced with OH groups and the resultant hydroxides precipitate out of solution. During the water injection process the alkoxide mixture converts to white flocs which are broken up and reformed by the mechanical agitation. After the hydrolysis is completed, the excess liquid, a mixture of water and hydrocarbons, is removed and the wet slurry is dried and crushed. The precursor powder is then thermally reacted to remove $H_2O$, OH and residual OR groups to form the desired $(Ti_{1-x}Zr_x)O_2$-precursor. As used herein the $(Ti_{1-x}Zr_x)O_2$-precursor includes $TiZrO_4$ and $(Ti_{1-s}Zr_s)O_2$ wherein s is the solubility limit for $ZrO_2$ in $TiO_2$. A preferred temperature range for thermally reacting the precursor powder is from about 500° C. to about 1300° C., with a most preferred temperature range of from about 700° C. to about 1100° C.

The desired TZ material is preferably converted to a powder by conventional mixing processes such as roller or vibratory ball milling. The TZ powder is then mixed with the proper amount of a barium oxide precursor and prepared to have enough excess barium to compensate for the small amount of $ZrO_2$ attrition which is introduced by milling with $ZrO_2$ based mill media. The mixture is then thermally reacted to convert it to the desired barium titanium zirconium oxide composition. Preferably, the thermal reaction is carried out at a temperature of about 1000° to about 1400° C.

The following is exemplary of a most preferred embodiment of the present invention and is not to be construed as necessarily limiting thereof.

A. Preparing $(Ti_{1-x}Zr_x)O_2$-Precursors From Alkoxides

The $(Ti_{1-x}Zr_x)O_2$-precursor was prepared using tetrabutyl titanate (DuPont Tyzor TBT) and n-butyl zirconate (Dynamit Noble). The as-received chemicals were assayed to determine their respective titania and zirconia contents and then blended in the proper proportions to produce different TZ powders having x values of 0.05, 0.085, 0.100, 0.250, 0.200, 0.213, and 0.250.

The respective alkoxides were mixed by heating in an open flask for several 8 hour periods, until the mixes' color changed from the initial yellow-amber color to a charcoal-red color. The alkoxide solutions typically lost between 1 and 12 weight percent alcohol during this process and approached temperatures of 240° C., even though vigorous boiling was avoided. At this point, the respective mixes were cooled to about 100° C., transferred to a percolator flask, and gravity injected into a water bath which was subjected to high shear blending using a Brinkman PT45/80 homogenizer.

About 500 grams of deionized $H_2O$ was added per mole of TZ prepared. (This amount of water represents about 5 to 6 times the amount needed to produce complete hydrolysis.) The hydrolyzed slurry, including mixed metal hydroxides in residual water and butanol, was first dried at a temperature of about 50° C. to drive off the alcohol, and dried a second time at a temperature of about 100° C. to remove excess water. The dried cake was then crushed and calcined at 900° C. for 16 hrs to convert the hydroxides to oxides.

The B.E.T. surface area of the powders and phase contents varied greatly with 16-hour calcine temperatures, as is shown in Table 1. The high surface area powders made at low calcine temperatures had higher levels of adsorbed water. A standard calcine temperature and time of 900° C. for 16 hours was chosen to reduce the ignition losses of the TZ material without over-reducing the surface area.

Figure 2:
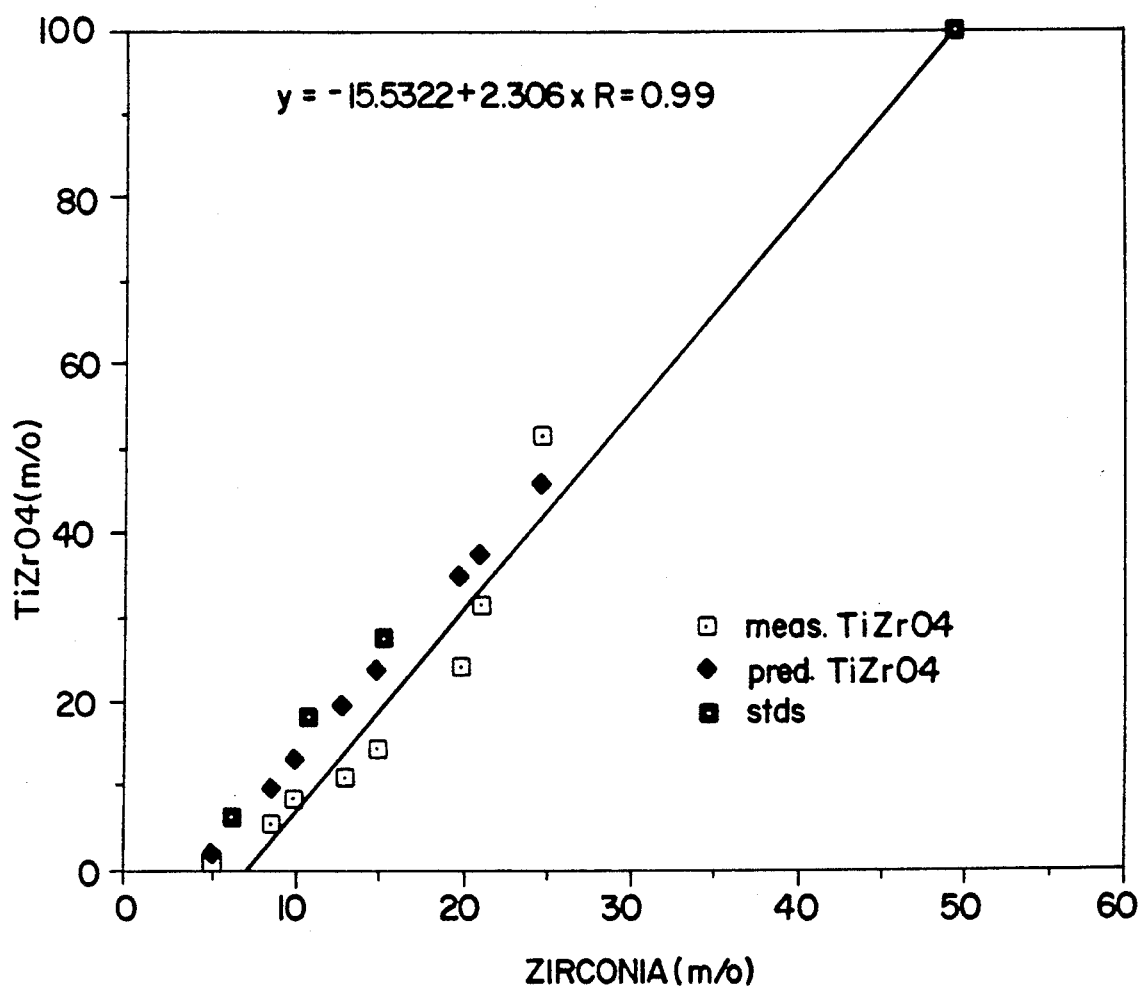
FIG. 2 illustrates $TiZrO_4$ content versus $ZrO_2$ content for a number of $(Ti_{1-x}Zr_x)O_2$ precursor powders prepared in accordance with a preferred embodiment of the present invention.
Figure 3A:
FIGS. 3a-3f illustrate the surface microstructures of $Ba(Ti_{0.915}Zr_{0.085})O_3$ ceramics having various L/S ratios ($\pm 0.0004$): (3a.) L/S=0.9997, 8X; (3b). L/S=0.9998, 100X; (3c.) L/S=0.9990, 50X; (3d.) L/S=0.9980, 200X; (3e.) L/S=0.9962, 200X; (3f.) L/S=0.9990, 200X.
Figure 3B:
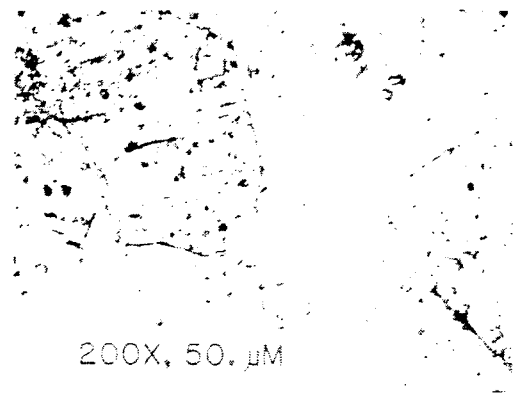
Figure 3C:
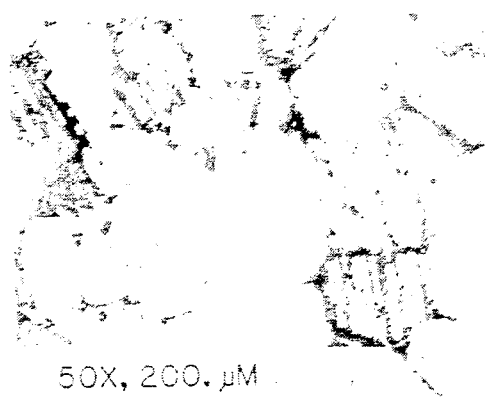
Figure 3D:
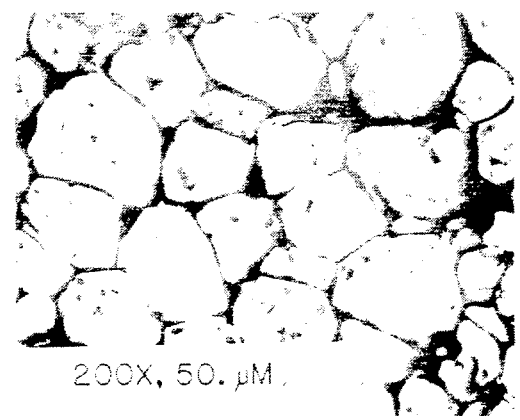
Figure 3E:
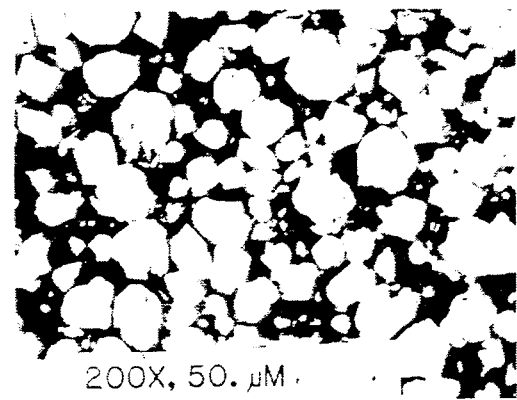
Figure 3F:
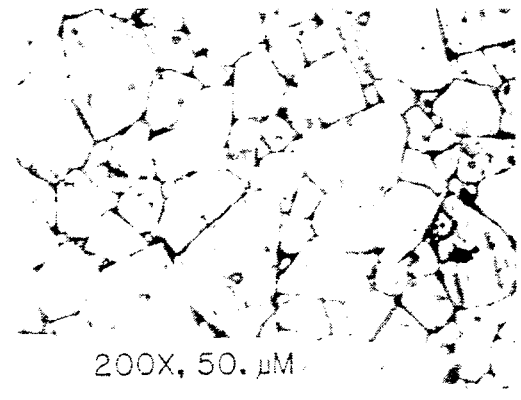

TZ powders were prepared to determine the change in phase distribution with zirconia content increasing from 5.0 mole percent to 50.0 mole percent. These precursors were designed to have zirconia contents of 5.0, 8.5, 10.0, 15.0, 20.0, 21.3 and 25.0 mole percent. The phase diagram for the titania-zirconia system shows that all added zirconia beyond the solubility limit, but less than 50 mole percent, should appear as the compound $TiZrO_4$ if a complete reaction occurs. See FIG. 4452 ($TiO_2$-$ZrO_2$) of T. Noguchi and M. Mizuno, "Phase Diagrams for Ceramists 1975 Supplement ed. E. Levin & H. McMurdie, (Amer. Cer. Soc. 1975), which FIG. 4452 is hereby incorporated herein by reference. X-ray diffraction analysis of these materials showed an increasing concentration of the compound $TiOZrO_4$ with increasing zirconia, after calcination, as is shown in FIG. 2 and Table 1. No free $ZrO_2$ was detected.

TABLE 1

| TZ-Sample No. | $ZrO_2$ (m/o) | Calcine (Temp °C.) | B.E.T. (m²/gm) | $TiZrO_4$ (m/o) | Rutile (m/o) | Anatase (m/o) |
|---|---|---|---|---|---|---|
| 1 | 8.5 | 500 | 94.2 | 2.70 | 0.00 | 97.3 |
| 2 | 8.5 | 800 | 44.6 | 6.90 | 0.00 | 93.1 |
| 3 | 8.5 | 850 | 22.6 | 5.00 | 10.0 | 85.0 |
| 4 | 8.5 | 900 | 12.7 | 4.60 | 46.0 | 49.0 |
| 5 | 8.5 | 950 | 6.36 | 4.65 | 87.2 | 8.15 |
| 6 | 5.0 | 900 | — | 1.20 | 91.5 | 7.3 |
| 7 | 10.0 | 900 | 11.1 | 7.4 | 63.3 | 28.8 |
| 8 | 13.0 | 900 | 11.9 | 11.1 | 35.7 | 53.7 |
| 9 | 15.0 | 900 | 13.1 | 14.3 | 37.2 | 48.5 |
| 10 | 20.0 | 950 | 5.9 | 24.4 | 72.0 | 3.6 |
| 11 | 21.3 | 900 | 7.5 | 31.3 | 48.1 | 20.6 |
| 12 | 25.0 | 900 | — | 53.3 | 25.8 | 22.9 |
| 13 | 50.0 | 900 | 9.8 | 100. | 0.0 | 0.0 |

The mole fraction of $TiZrO_4$, u, generated by adding x mole fraction $ZrO_2$ to $(1-x)$ mole fraction $TiO_2$ and thermally reacting the mixture can be calculated by solving the chemical balance equation,

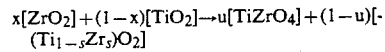

$$x[ZrO_2]+(1-x)[TiO_2] \rightarrow u[TiZrO_4]+(1-u)[(Ti_{1-s}Zr_s)O_2]$$

In this equation s is the solubility limit for zirconia in titania.

Most preferably, sincd the amounts of titanium and zirconium must remain constant, the equations for u and (1-u) in terms of x and s are, $$u=[2(x-s)]/(1-2s) \text{ and } (1-u)=(1-2x)/1-2s),$$

wherein x is greater than s an less than 0.50. The estimated solubility limit of zirconia in titania was determined by extrapolation of the estimated $TiZrO_4$ content versus zirconia content. The molar concentrations of $TiZrO_4$ present in the TZ powders were calculated by assuming that the components are present in direct proportion to the height of their 1005 diffraction peak magnitudes. This assumption was roughly verified by measuring the peak intensities of standards made from anatase/rutile/$TiZrO_4$ mixes. A solubility limit of about 4.2 mole percent is obtained if only the higher surface area TZ powders with $x \leq 0.250$ are used. An unusually high solubility limit, 6.8 mole percent, results for the complete data, as is shown in FIG. 2. The lower value, 4.2 mole percent, is presumed to be more accurate because a small $TiZrO_4$ peak is observed in the x-ray pattern of the TZ powder containing 5.0 mole percent $ZrO_2$. Deviations obtained with TZ powder having higher zirconia concentrations may be related to the coarser particle sizes of these materials.

B. Formulation Process to Control the L/S Ratio

Eliminating minor phases, or obtaining an overall large to small cation (hereinafter L/S ratio) equal to 1.000, is achieved by preparing compositions which contain greater than a stoichiometric amount of BaO and then monitoring the change in the L/S ratio due to zirconia additions by mill media attrition and $Ba(OH)_2$ removal by filter drying after calcination and final milling. These compositions were prepared by wet ball milling mixes of $BaCO_3$ (Nihon, HG grade) with the previously prepared TZ powders. A small amount of $Mn(NO_3)_2$, 0.25 mole percent, was usually added to each composition to lower the dissipation factor. The formulations were designed to have nominal L/S ratios in the range of 1.0050 to 1.0080. Milling was performed using zirconia mill media (Corning) in polypropylene bottles. Mill media attrition rates were measured in similarly milled composition which did not contain any deliberately added zirconia. These values then allowed the L/S ratio of the initial formulation to be chosen so as to insure that the final milled materials were still BaO-excess. The standard milling period used was 24 hours.

High calcine temperatures in the range of 1200° C. to 1280° C. for 5 hours were used to insure complete reaction. Sintering was minimal because these materials were still BaO-excess. The calcined powders were crushed and sieved past −35 mesh and final milled for 24 hours together with 6.0 weight percent (w/o) microcrystalline cellulose, Avicel PH105 (FMC), as a binder. The final milled slip was filter dried by decanting the slip onto a filter paper held in a Buchner funnel subject to a vacuum. The amount of water removed by vacuum filtering was measured and a sample of the water was analyzed for Ba using inductively coupled plasma atomic-emission (ICP) spectrometry. The oven dried filter cake was then be crushed, sieved, pressed and fired.

The L/S value for the final milled composition was calculated by combining changes in L/S due to milling attrition with those due to $Ba(OH)_2$ removal by vacuum filtering. The mill media attrition rates due to initial and final milling resulted in a total down shift in the L/S ratio of about $-0.0030 \pm 0.0015$. The final processed powders typically proved to be very close to stoichiometry but still slightly BaO-excess, as was also confirmed by noting that their as-fired surface microstructures were still very fine-grained after firing at 1400° C.

C. Surface Microstructure Evaluation

A more accurate determination of the final L/S ratio was facilitated by an unexpected dependence of fired grain size on the deviation from stoichiometry. The standard firing cycle used involved heating the parts to 1400° C. with a final heating rate of about 0.83° C./minute between 1330° C. and 1400° C.; then cooling in a CM tube furnace controlled by a Micricon 823 controller. Compositions which were still BaO-excess after milling and filter drying, that is, which did not exhibit grain growth or densify on sintering were reprocessed by remilling for 1 to 4 hours and filtered again. Those compositions which became only sightly BaO-excess after reprocessing sintered during the next firing but their grain sizes remained below 5.0 micrometers. A very small change in the L/S ratio incurred by subsequent reprocessing typically produced a dramatic increase in the fired grain size. This change in sintering behavior is believed to be due to a change in the L/S ratio from being slightly BaO-excess to becoming slightly $TiO_2$-excess after reprocessing.

The change in L/S ratio was much more accurately determined after reprocessing since the milling contamination was greatly reduced by the shorter milling time. About 10 times less $Ba(OH)_2$ was removed by the second filter drying process and this value was accurately determined by analyzing the filter water. The uncertainty in the L/S ratio is primarily due to the uncertainty in the mill media attrition rates or about $\pm 0.00004$/hr. The maximum shift in the L/S ratio after this second process was approximately $-0.0010$ or less, yielding a final L/S value of between 0.9990 and 1.0000.

The fired grain size obtained in the slightly $TiO_2$-excess compositions was found to be inversely dependent on the heating rate used in the 1300° C. to 1400° C. program segment. Pellets prepared from these materials had as-fired surface grains, in the range of 50 to 100 micrometers when they were sintered using the previously mentioned firing cycle. Much larger average surface grain sizes of greater than 300 micrometers and sometimes as high as 1,000 micrometers were obtained from the same materials when a reduced heating rate of 0.21° C./minute was used in the final heating segment. Doubling or quadrupling the heating rate for the 1300° C. to 1400° C. segment effectively halved and quartered the surface grain sizes observed on pellets prepared from compositions having L/S ratios in the preferred range. These parts had fired densities in the range of 5.86 to 6.00 gms/cm$^3$, between 97 to 99% of their theoretical densities.

The effect of further departures from stoichiometry on the titania-excess side was determined by acetic acid removal of more barium from the final milled slurry as indicated by ICP spectrometry of the filter water. The as-fired surface microstructures obtained using the slow heating rate cycle exhibited increased thermal etching at the surface grain boundaries and decreased grain growth as the concentration of excess titania increased or the L/S ratio decreased. Accompanying this drop in grain size was an increase in the concentration and size of gaps appearing at three and four grain junctions. The average as-fired surface grain size decreased from greater than 350 micrometers to about 40 micrometers when the L/S ratio shifted from 0.9985 to 0.9960.

The advantage of employing the TZ precursor in place of mixed oxides was evident when the same milling technique was used to prepare compositions where the TZ precursor was replaced with a blend of $TiO_2$ (TAM, high purity) and $ZrO_2$ (Harshaw, E1. Grade) in a 8.5 mole percent $BaZrO_3$. The respective B.E.T. surface areas of the titanate and zirconia used are 4.2 and 26.0 m$^2$/gm. Although the composition exhibited a fine grained, baria-excess microstructure, reprocessing this material did not produce exaggerated grain growth. Instead, only moderate grain growth was observed when the processing shifted the L/S ratio to less than 1.000. While not wishing to be bound by theory, it is believed that the presence of titania with zirconia in solid solution, or of $TiZrO_4$, in the precursor powder may be necessary for this processing technique to be effective.

Electrical Measurements

The polarization hysteresis loops were measured in pellets containing 8.5 mole percent zirconia and having a fired thickness in the range of 0.060 to 0.090 cm. and a diameter of 1.45 cm using an operational amplifier circuit, similar to that proposed by Tsui et al. in "New Ferroelectric Hysteresis Curve Tracer Featuring Compensation and Virtual Sample Grounding," Rev. Sci. Instru. 39 (10), 1423-4 (1968), and a Tektronix 5116 oscilloscope with a 5D10 waveform digitizer, after the pellets were supplied with fired-on silver electrodes. These parts were prepared to have different L/S ratios and had surface microstructures similar to those shown in FIGS. 3a-3f. Samples having a L/S ratio in the range of 0.9990 to 1.0000 and which were coarse grained exhibited very square polarization loops, as is shown in FIGS. 4a through 4d.

Figure 4A:
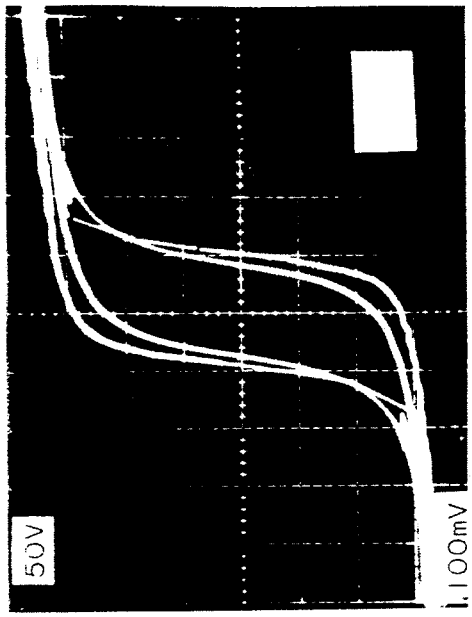
FIGS. 4-4d illustrate polarization versus electric field traces of $Ba(Ti_{0.915}Zr_{0.085})O_3$ ceramics. Horizontal = 800 V/cm per large division; Vertical = 6.0 ucoul/cm² per large division. (4a.) larger loop: L/S=0.9990, smaller loop: L/S=0.9962;(4b.) larger loop: L/S=0.9990, smaller loop: L/S=0.9980; (4c.) larger loop: L/S=0.9990, smaller loop L/S=0.9990; (4d.) larger loop: L/S=0.9990, smaller loop: L/S=0.9990.
Figure 4B:
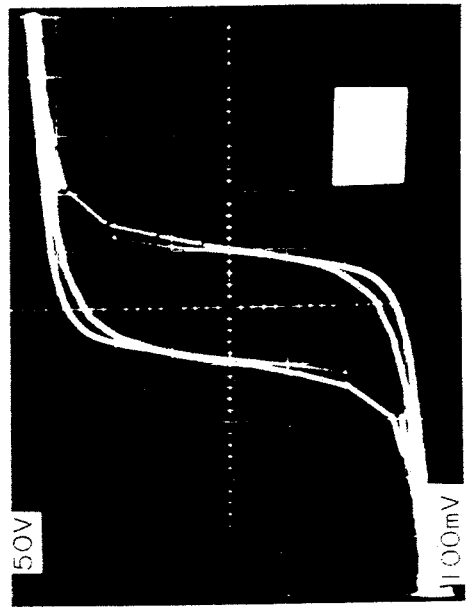
Figure 4C:
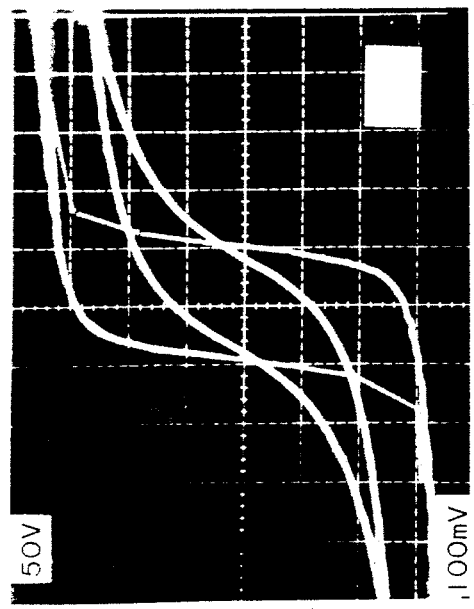
Figure 4D:
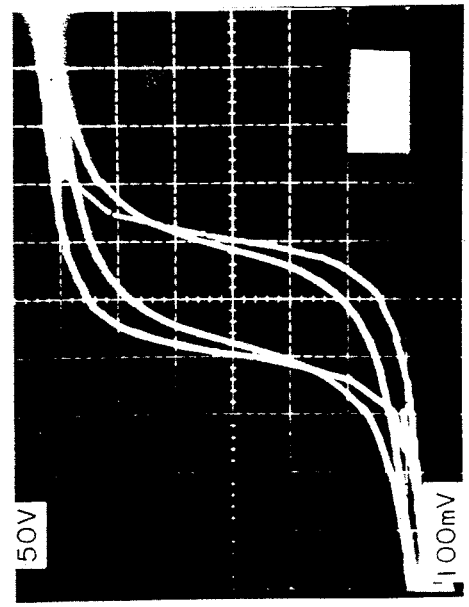

Materials having larger departures from stoichiometry exhibited progressively more slanted loops as the amount of excess titania increased and the grain size decreased, as is shown in FIGS. 4a and 4b. Only slightly less square polarization loops were observed in finer grained pellets whose grain size was modified by using a faster heating rate for the 1290° C. to 1400° C. segment as is shown in FIGS. 4c and 4d. The presence of excess titania appears to be primarily responsible for the observed deterioration in loop shape, as is shown in FIG. 4a, but some of the decrease in squareness can be attributed to the decrease in grain size, as is shown in FIGS. 4c and 4d.

The relative permittivities, coercive field values, and remanent polarization levels at various temperatures were measured for a series of parts prepared from compositions having barium zirconate concentrations of 5, 8.5, 10, 15 and 20 mole percent. These compositions were all made with TZ precursors and had microstructures indicative of L/S cation ratios of between 0.9985 and 0.9995. The relative permittivity values were calculated from capacitances measured at 1 KHz. and 1 V. RMS. using an Hewlett Packard 4192A Low Frequency Impedance Analyzer. Coercive field and remanent polarization levels were calculated from the hysteresis loops generated using the previously mentioned circuit and oscilloscope with applied voltage levels of more than double that needed to open the polarization loop. The test samples were heated inside a model 2300 Delta Design oven controlled to ±2° C.

Figure 5:
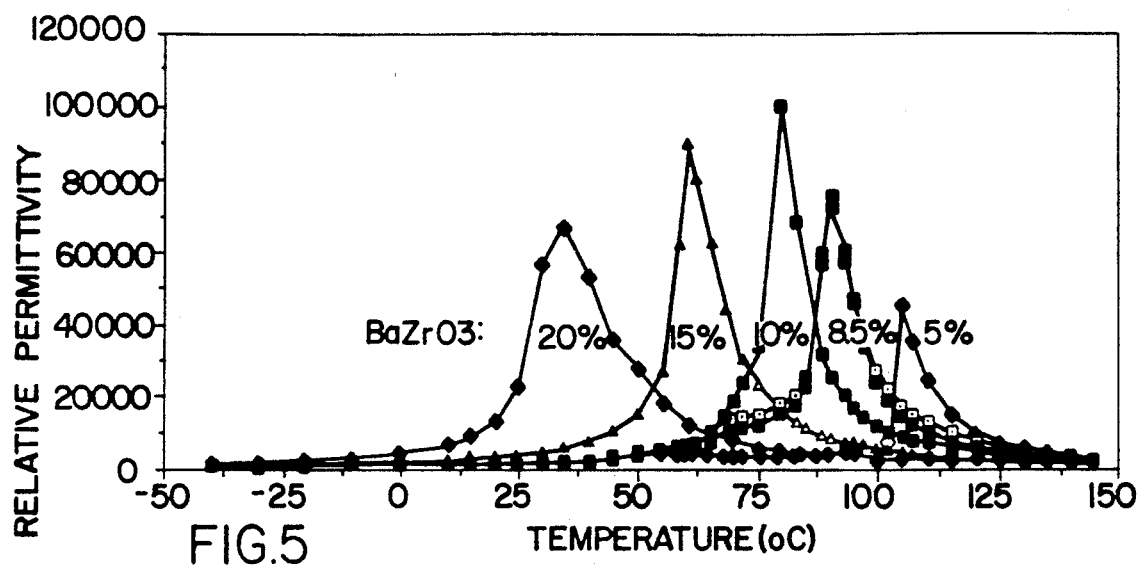
FIG. 5 graphically illustrates relative permittivity versus temperature for various $BaZrO_3$ concentrations (mole percent) in $Ba(Ti_{1-x}Zr_x)O_3$ materials prepared in accordance with the present invention.

Extremely high peak relative permittivity values of between 45,000 and 100,000 were determined for these parts, as is shown in FIG. 5. Increasing zirconia substitution for titania caused the Curie temperature to decrease, essentially duplicating the data presented by Hennings and Schnell in "Diffuse Ferroelectric Phase Transitions in Ba(Ti$_{1-y}$Zr$_y$)O$_3$ Ceramics," J. Am. Cer. Soc. 65(11), 539–544 (1982). The highest peak value was obtained for the 10 mole percent composition but the 8.5 and 15 mole percent compositions did not have much lower peak values. The somewhat broader, lower peak observed for the 20 mole percent part suggests that a greater segregation of the Zr atoms on the TiO$_2$-sublattice had occurred. The peak permittivity values are about 2–3 times greater than those reported by Hennings et al., supra. for materials having 1.0 mole percent of excess titania added.

Figure 6:
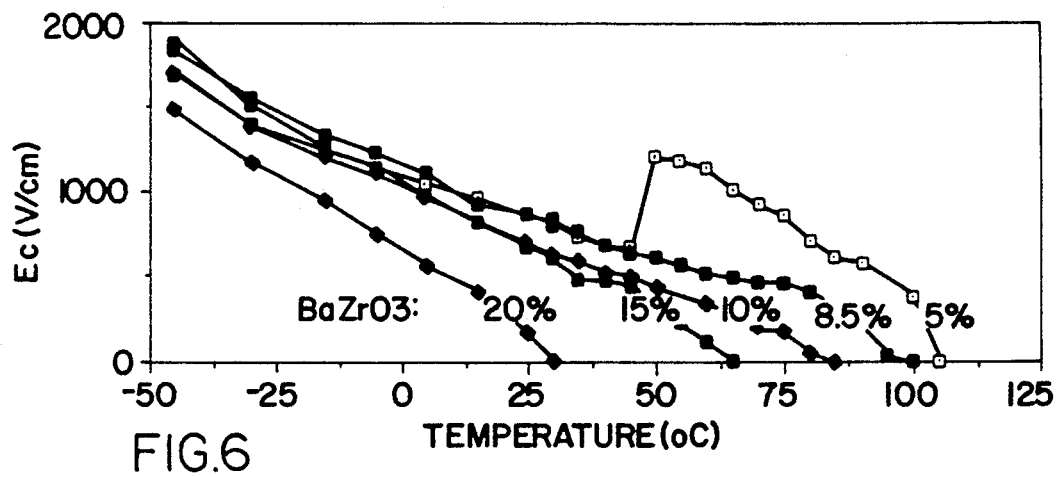
FIG. 6 graphically illustrates coercive field versus temperature for various $BaZrO_3$ concentrations (mole percent) in $Ba(Ti_{1-x}Zr_x)O_3$ materials prepared in accordance with the present invention.

The coercive field values, shown in FIG. 6, decreased in a nearly linear fashion with increasing temperature with the exception of the 5 mole percent composition. The abrupt change in the coercive field value at 50° C. for the 5 mole percent zirconia composition coincides with the orthorhombic to tetragonal phase change. Apparently the tetragonal form of BaTiO$_3$ has a higher coercive voltage than does the orthorhombic form. The room temperature coercive field values were all between 0.8 and 1.0 KV/cm for all but the 20 mole percent composition which was close to its Curie point. Loops with similar size and shape were also measured for selected parts using a 0.60 Hz sawtooth voltage, demonstrating that domain wall heating is not a problem with these materials.

Figure 7:
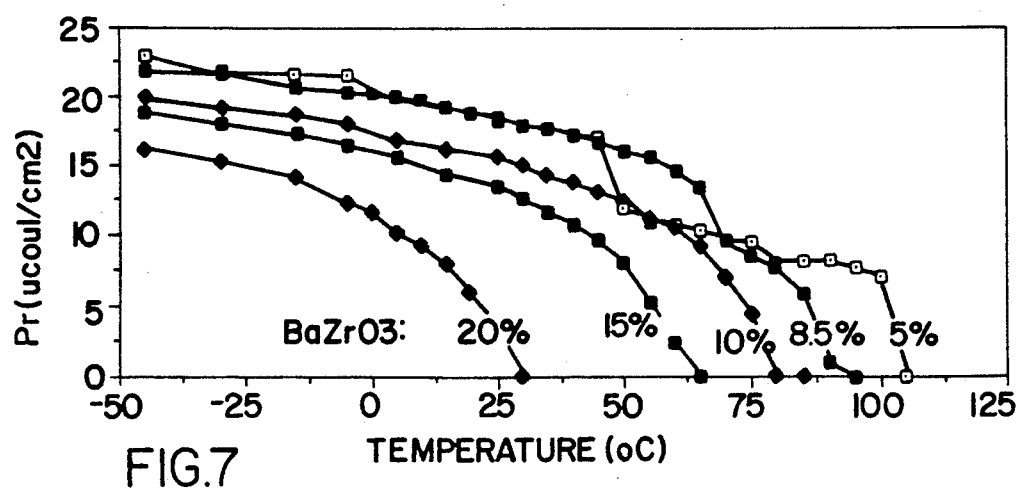
FIG. 7 graphically illustrates remanent polarization versus temperature for various $BaZrO_3$ concentrations (mole percent) in $Ba(Ti_{1-x}Zr_x)O_3$ materials prepared in accordance with the present invention.

Remanent polarization values decreased in a parabolic manner with increasing temperature for all but the 5 mole percent zirconia composition, as is shown in FIG. 7. The abrupt change in polarization noted near 50° C. for this specimen and somewhat less pronounced change observed for the 8.5% specimen can again be attributed to the orthorhombic to tetragonal phase change in these materials. The tetragonal phase must therefore have about two thirds the remanent polarization level exhibited by the orthorhombic or rhombohedral phases, or about 12 microcouloumbs/cm$^2$, in ceramic form. The lower coercive field and higher remanent polarization values noted for the lower temperature phases explain why these phases are more desirable than the tetragonal form for pulse generation applications.

Figure 8A:
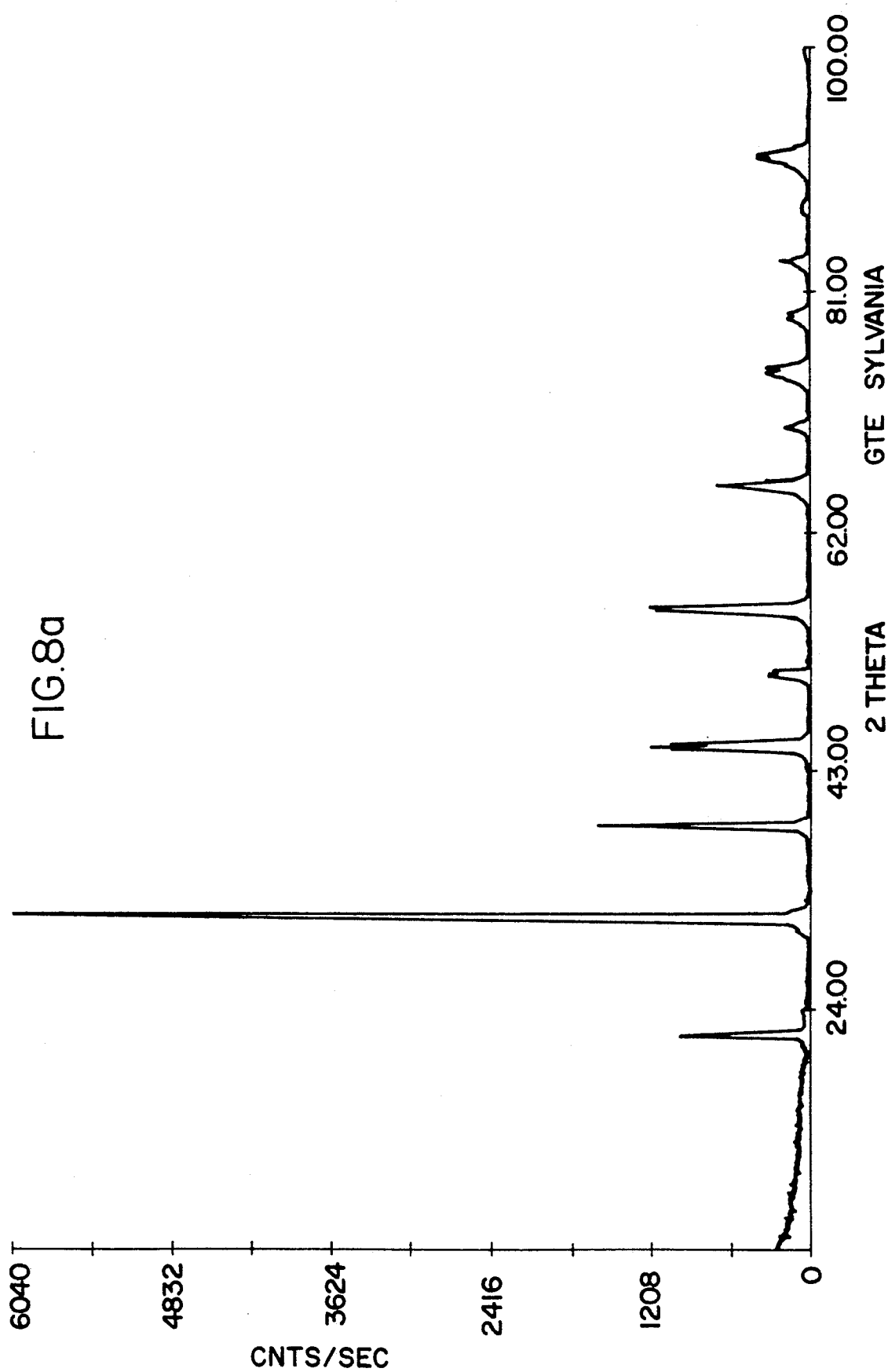
FIGS. 8a and 8b illustrate the x-ray diffraction patterns of barium titanium zirconium oxide prepared by a conventional technique.
Figure 8B:
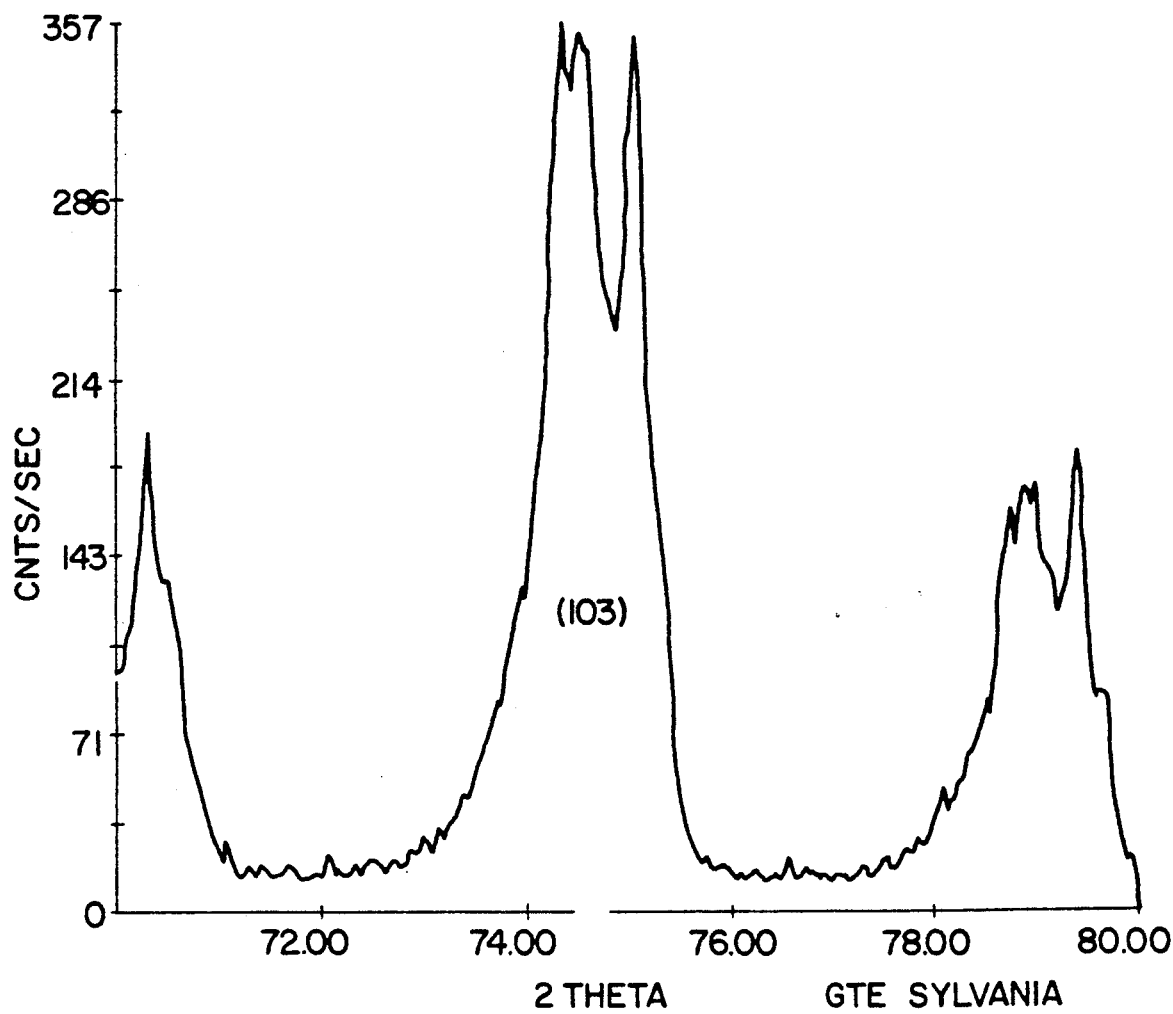
Figure 9A:
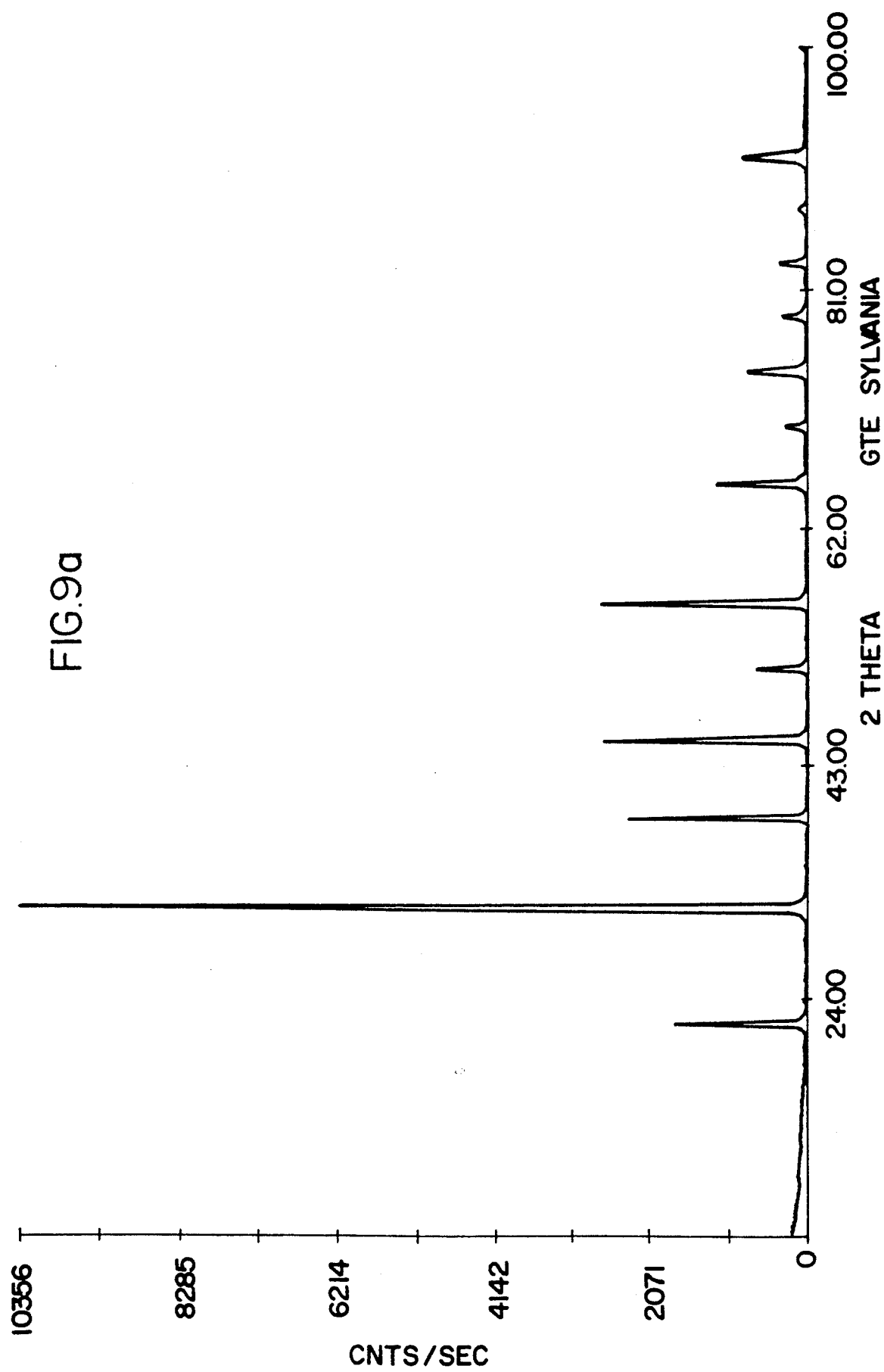
FIGS. 9a and 9b illustrate the x-ray diffraction patterns of barium titanium zirconium oxide prepared in accordance with the present invention.
Figure 9B:
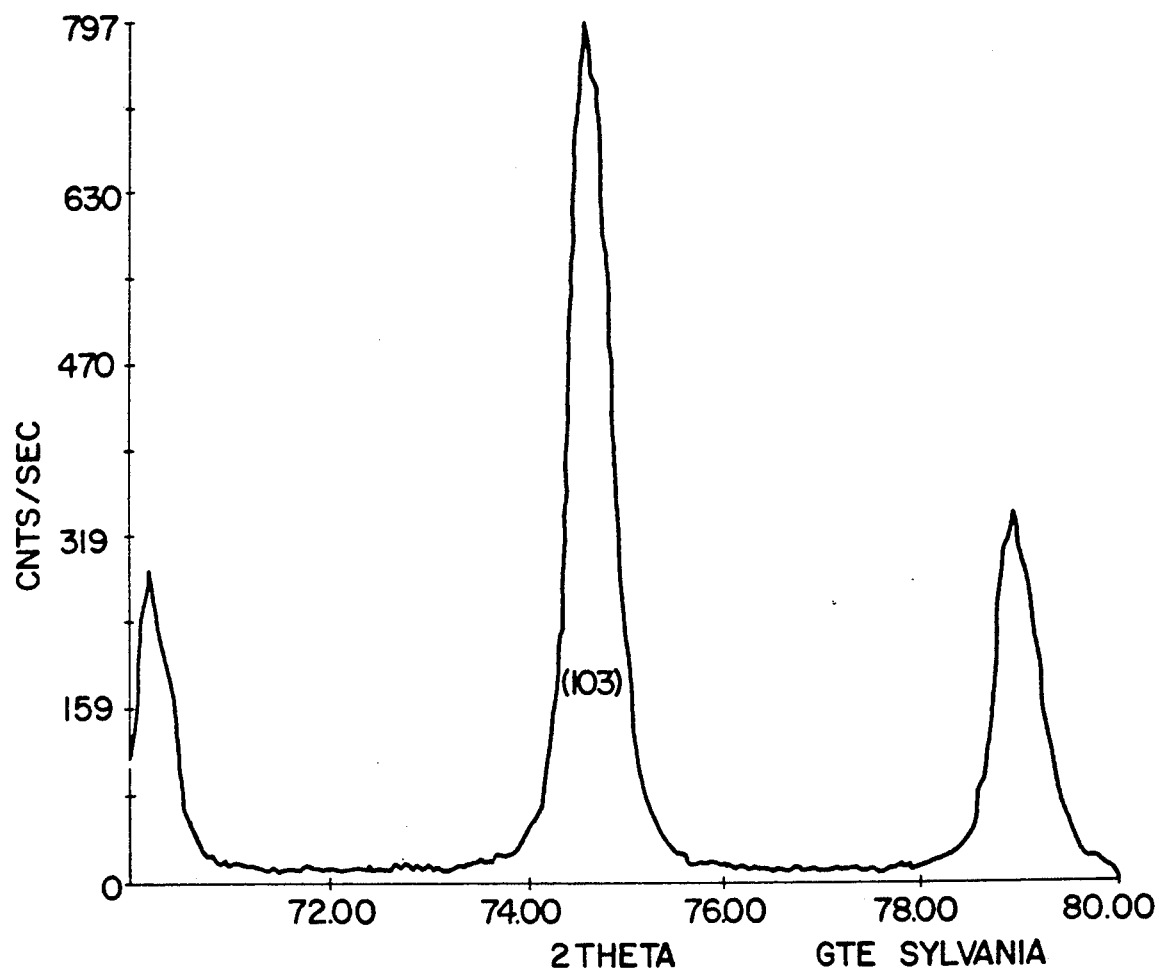

The improved randomness in the distribution of the Ti and Zr atoms on the TiO$_2$ sublattice of the compound achieved by the method of the present invention is further evidenced by a comparison on x-ray diffraction measurements and electrical property measurements made on a sample prepared by the present method and those made on a sample of similar composition made by heretofore conventional methods. After thermal reaction, the x-ray diffraction pattern of Ba(Ti$_{0.915}$Zr$_{0.085}$)O$_3$ material prepared in accordance with the method of the present invention (FIGS. 9a and 9b) was compared with that of a conventionally prepared material of otherwise identical composition and final processing (FIGS. 8a and 8b). The high-angle peaks observed in the diffraction pattern of the conventionally processed material are broadened and split, as is shown in FIGS. 8a and 8b, indicative of internal compositional gradients in spite of having used an ultra fine ZrO$_2$ powder. In contrast, all peaks in the material prepared by the present method are uniform and narrow, as is shown in FIGS. 9a and 9b, indicative of the absence of chemical inhomogeneities.

Figure 10:
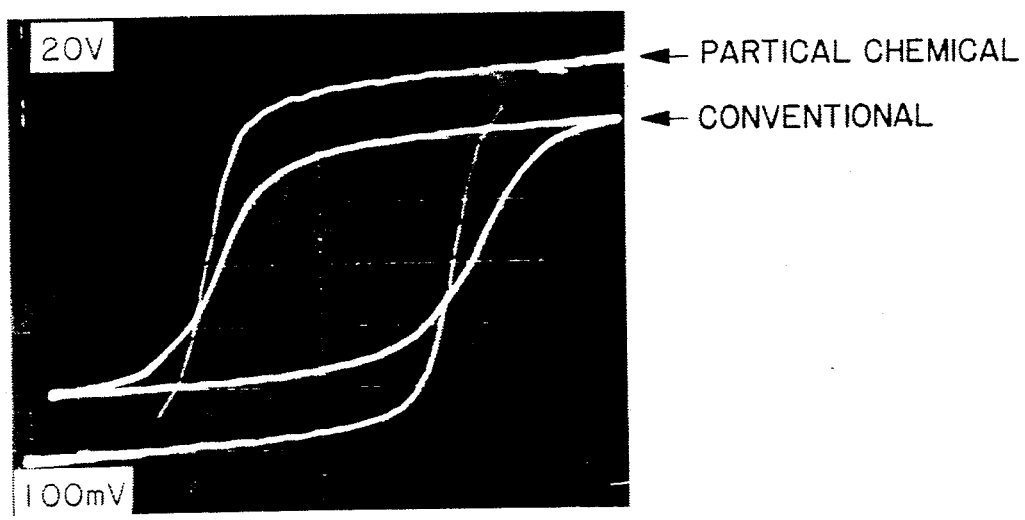
FIG. 10 compares the polarization characteristics of barium titanium zirconium oxide prepared by conventional techniques with those of barium titanium zirconium oxide prepared in accordance with the present invention.

The polarization characteristics of both materials were tested after firing them at 1370° C. for 4 hrs and electroding them with the same silver ink during the same silver firing cycle. Lower remanent polarization values, about 10.4 microcouloumbs/cm$^2$, were observed in samples prepared from the conventionally prepared powder whereas higher values, about 16.2 microcouloumbs/cm$^2$, were noted in the parts prepared by the present method under 100 v.r.m.s., 60 Hz applied voltage, as is shown in FIG. 10. Both materials had identical microstructures with respect to grain size and the absence of minor phase content. The improvement in remanent polarization is therefore attributed to the improved randomness of the small cation mixing. Improved polarization loop squareness is also evident for parts made from powders prepared in accordance with the partial chemical process of the present invention. The partially chemically processed parts have almost double the peak dielectric constant and remanent polarization values expected from reference to the technical literature.

While there as been shown and described what are considered preferred embodiments of the present invention, it will be obvious to those skilled in the art that various changes and modifications may be made therein without departing from the invention as defined by the appended claims.

What is claimed is:

1. A method for preparing a barium titanium zirconium oxide ferroelectric ceramic composition, said method comprising:
   (a) reacting tetraalkyl titanate and tetraalkyl zirconate in appropriate amounts to produce (Ti$_{1-x}$Zr$_x$)-alkoxide wherein 021 x≦0.25;
   (b) reacting said (Ti$_{1-x}$Zr$_x$)-alkoxide to form a two phase mixture of TiZrO$_4$ and (Ti$_{1-s}$Zr$_s$)O$_2$, wherein s is the solubility limit for ZrO$_2$ in TiO$_2$;

(c) admixing said $(Ti_{1-s}Zr_s)O_2$ and $TiZrO_4$ with a BaO precursor, said BaO precursor, $(Ti_{1-s}Zr_s)O_2$ and $TiZrO_4$ being present in a molar ratio of $$\frac{(BaO\ precursor)}{((Ti_{1-s}Zr_s)O_2 + TiZrO_4)}$$

having a value greater than 1; and (d) heating the admixture for a period of time and at a sufficient temperature to produce $Ba(Ti_{1-x}Zr_x)O_3$ wherein $0 < x \leq 0.25$.

2. A method in accordance with claim 1 wherein said step of reacting said $(Ti_{1-x}Zr_x)$-alkoxide to form $TiZrO_4$ and $(Ti_{1-s}Zr_s)O_2$ comprises:

hydrolyzing said $(Ti_{1-x}Zr_x)$-alkoxide to form a precipitate;

isolating said precipitate; and heating said precipitate for a sufficient period of time and at a sufficient temperature to form $TiZrO_4$ and $(Ti_{1-s}Zr_s)O_2$ wherein s is the solubility limit for $ZrO_2$ in $TiO_2$.

3. A method in accordance with claim 2 wherein said tetraalkyl titanate includes alkyl groups which are straight, branched, or cyclic alkyl groups having from 1 to 12 carbon atoms per alkyl group.

4. A method in accordance with claim 3 wherein said alkyl groups have from 2 to 8 carbon atoms per alkyl group.

5. A method in accordance with claim 9 wherein said alkyl groups have from 4 to 6 carbon atoms per alkyl group.

6. A method in accordance with claim 2 wherein said tetraalkyl zirconate includes alkyl groups which are straight, branched, or cyclic alkyl groups having from 1 to 12 carbon atoms per alkyl group.

7. A method in accordance with claim 6 wherein said alkyl groups have from 2 to 8 carbon atoms per alkyl group.

8. A method in accordance with claim 7 wherein said alkyl groups have from 4 to 6 carbon atoms per alkyl group.

9. A method in accordance with claim 2 wherein said precipitate is heated at a temperature of from about 500° C. to about 1300620 C.

10. A method in accordance with claim 2 wherein said precipitate is heated at a temperature of from about 700° C. to about 1100620 C.

11. A method in accordance with claim 2 wherein said step of heating the admixture of said $(Ti_{1-s}Zr_s)O_2$, $TiZrO_4$, and BaO precursor to produce $Ba(Ti_{1-s}Zr_s)O_3$ wherein $0 < x \leq 0.25$ is carried out at a temperature in the range of from about 1000° to about 1400° C.

12. A method in accordance with claim 11 wherein the temperature if from about 1200° to about 1280° C.

13. A method in accordance with claim 1 wherein said BaO precursor is selected from the group consisting of barium carbonate, barium nitrate, barium chloride, and barium acetate.

14. A method in accordance with claim 13 wherein said BaO precursor is barium carbonate.

15. A method in accordance with claim 13 wherein said BaO precursor is barium nitrate.

16. A method in accordance with claim 13 wherein said BaO precursor is barium chloride.

17. A method in accordance with claim 13 wherein said BaO precursor is barium acetate.

18. A method for preparing a barium titanium zirconium oxide ferroelectric ceramic composition, said method comprising:

(a) preparing $(Ti_{1-x}Zr_x)$-alkoxide wherein $0 < x \leq 0.25$;

(b) reacting said $(Ti_{1-x}Zr_x)$-alkoxide to form a two phase mixture of $TiZrO_4$ and $(Ti_{1-s}Zr_s)O_2$, wherein s is the solubility limit for $ZrO_2$ in $TiO_2$;

(c) admixing said $(Ti_{1-s}Zr_s)O_2$ and $TiZrO_4$ with a BaO precursor, said BaO precursor, $(Ti_{1-s}Zr_s)O_2$ and $TiZrO_4$ being present in a molar ratio of $$\frac{(BaO\ precursor)}{((Ti_{1-s}Zr_s)O_2 + TiZrO_4)}$$

having a value greater than 1; and (d) heating the admixture for a period of time and at a sufficient temperature to produce $Ba(Ti_{1-x}Zr_x)O_3$ wherein $0 < x \leq 0.25$.

19. A method for preparing a barium titanium zirconium oxide ferroelectric ceramic composition, said method consisting of the steps:

(a) reacting tetrabutyl titanate and n-butyl zirconate in appropriate amounts to produce $(Ti_{1-x}Zr_x)$-alkoxide wherein $0 < x \leq 0.25$;

(b) hydrolyzing said $(Ti_{1-x}Zr_x)$-alkoxide to form a slurry;

(c) drying said slurry to obtain a precipitate;

(d) calcining said precipitate at a temperature in the range of from about 700° C. to about 1100° C. for a sufficient period of time to form a two phase mixture of $TiZrO_4$ and $(Ti_{1-s}Zr_s)O_2$, wherein s is the solubility limit for $ZrO_2$ in $TiO_2$;

(c) admixing said $(Ti_{1-s}Zr_s)O_2$ and $TiZrO_4$ with barium carbonate, said barium carbonate, $(Ti_{1-s}Zr_s)O_2$ and $TiZrO_4$ being present in a molar ratio of $$\frac{barium\ carbonate}{((Ti_{1-s}Zr_s)O_2 + TiZrO_4)}$$

having a value greater than 1; and (d) heating the admixture for a period of time and at a temperature of from about 1200° C. to about 1280° C. to produce $Ba(Ti_{1-x}Zr_x)O_3$ wherein $0 < x \leq 0.25$.

* * * * *